US011198586B2

United States Patent
Murata et al.

(10) Patent No.: US 11,198,586 B2
(45) Date of Patent: Dec. 14, 2021

(54) BRAKING DECELERATION MEASUREMENT OF AN ELEVATOR SYSTEM

(71) Applicant: Otis Elevator Company, Farmington, CT (US)

(72) Inventors: Jiro Murata, Chibaken (JP); Takashi Takeuchi, Chibaken (JP)

(73) Assignee: OTIS ELEVATOR COMPANY, Farmington, CT (US)

(*) Notice: Subject to any disclaimer, the term of this patent is extended or adjusted under 35 U.S.C. 154(b) by 20 days.

(21) Appl. No.: 16/502,642

(22) Filed: Jul. 3, 2019

(65) Prior Publication Data
US 2021/0002100 A1   Jan. 7, 2021

(51) Int. Cl.
| B66B 5/00 | (2006.01) |
| B66B 3/00 | (2006.01) |
| B66B 5/02 | (2006.01) |
| G06T 7/20 | (2017.01) |
| G06K 9/00 | (2006.01) |

(52) U.S. Cl.
CPC .......... B66B 5/0031 (2013.01); B66B 5/0087 (2013.01); G06K 9/00711 (2013.01); G06T 7/20 (2013.01); G06T 2207/10016 (2013.01)

(58) Field of Classification Search
CPC ....... B66B 1/34; B66B 5/0031; B66B 5/0087; G06K 9/00711; G06T 7/20; G06T 2207/10016
USPC ....................................................... 348/135
See application file for complete search history.

(56) References Cited

U.S. PATENT DOCUMENTS

| 5,578,801 A * | 11/1996 | Hofmann | ................. B66B 1/28 187/287 |
| 7,567,844 B2 * | 7/2009 | Thomas | ................. G05B 15/02 700/19 |
| 2001/0025746 A1 * | 10/2001 | Bammert | ............. B66B 1/3492 187/394 |
| 2011/0202178 A1 * | 8/2011 | Zhen | ..................... B66B 13/143 700/275 |
| 2014/0008155 A1 * | 1/2014 | Rossignol | ............... B66B 1/302 187/290 |
| 2014/0014441 A1 * | 1/2014 | Kang | ................... B66B 1/3492 187/247 |

(Continued)

FOREIGN PATENT DOCUMENTS

| CN | 103213883 A | 7/2013 |
| CN | 203319432 U * | 12/2013 |

(Continued)

OTHER PUBLICATIONS

European Search Report for Application No. 19219658.2, dated Jul. 20, 2020, 5 Pages.

(Continued)

*Primary Examiner* — Albert Kir
(74) *Attorney, Agent, or Firm* — Cantor Colburn LLP

(57) ABSTRACT

A method of measuring braking deceleration of an elevator based on a video of a motion of a hoisting machine taken by a mobile device, the motion of the hoisting machine including a motion of a brake and a motion of a traction sheave, the method including capturing the video, processing the video, and calculating a braking deceleration of the elevator based on the processed video.

18 Claims, 8 Drawing Sheets

(56) References Cited

U.S. PATENT DOCUMENTS

| | | | | |
|---|---|---|---|---|
| 2014/0058700 A1* | 2/2014 | Gehrke | ............... | B66B 5/0037 |
| | | | | 702/141 |
| 2018/0016117 A1* | 1/2018 | Palazzola | .............. | B66B 7/1238 |
| 2019/0292014 A1* | 9/2019 | Sudi | ...................... | B66B 1/3461 |
| 2020/0148505 A1* | 5/2020 | Oggianu | ................ | B66B 13/22 |

FOREIGN PATENT DOCUMENTS

| | | |
|---|---|---|
| CN | 203319432 U | 12/2013 |
| CN | 105270956 A | 1/2016 |
| CN | 205843717 U | 12/2016 |
| JP | 2011042840 A | 3/2011 |
| JP | 2016183048 A | 10/2016 |
| JP | 2019056391 A | 4/2019 |

OTHER PUBLICATIONS

Chinese Office Action for Application No. 201911419389.2; dated Oct. 18, 2021; 7 Pages.

\* cited by examiner

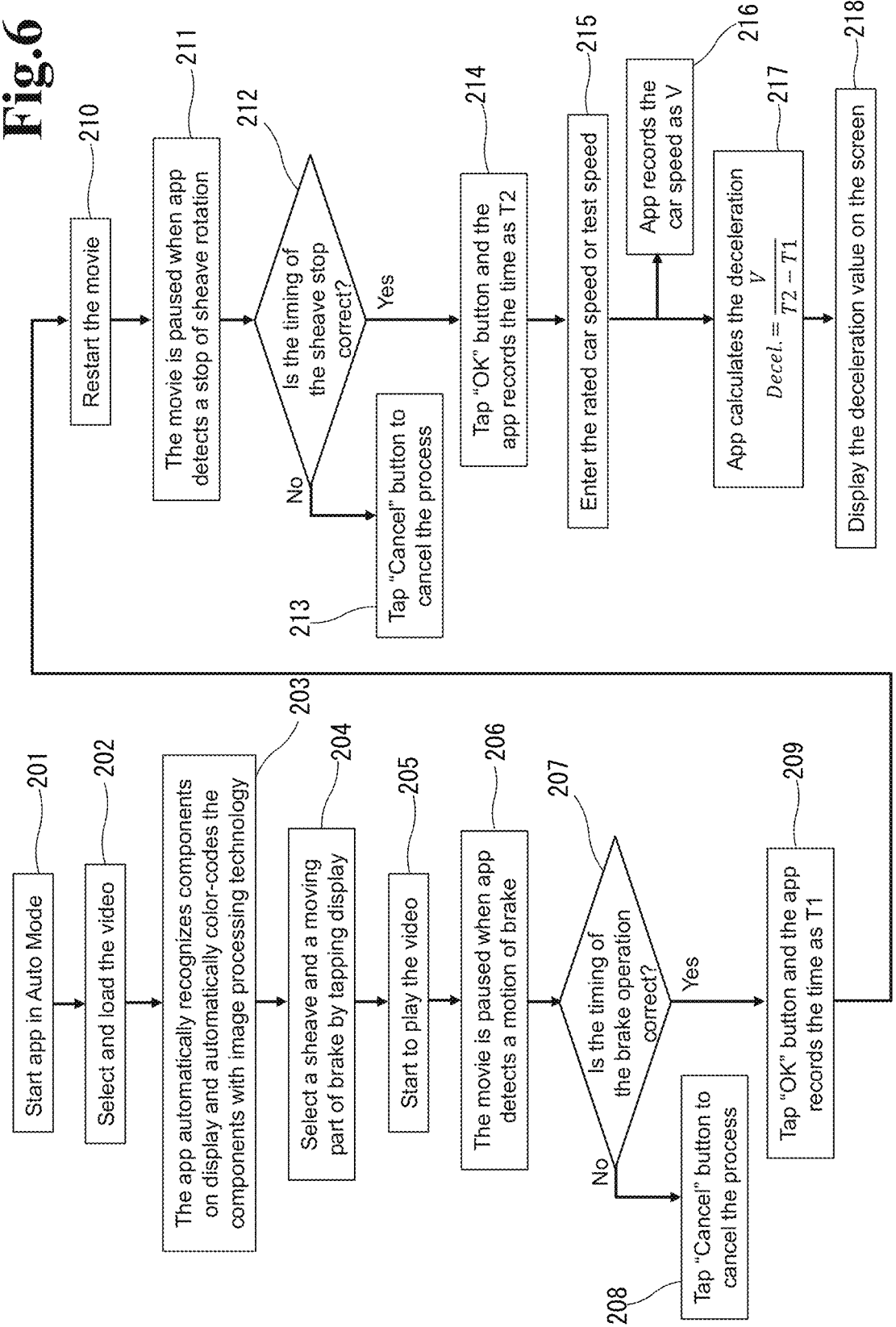

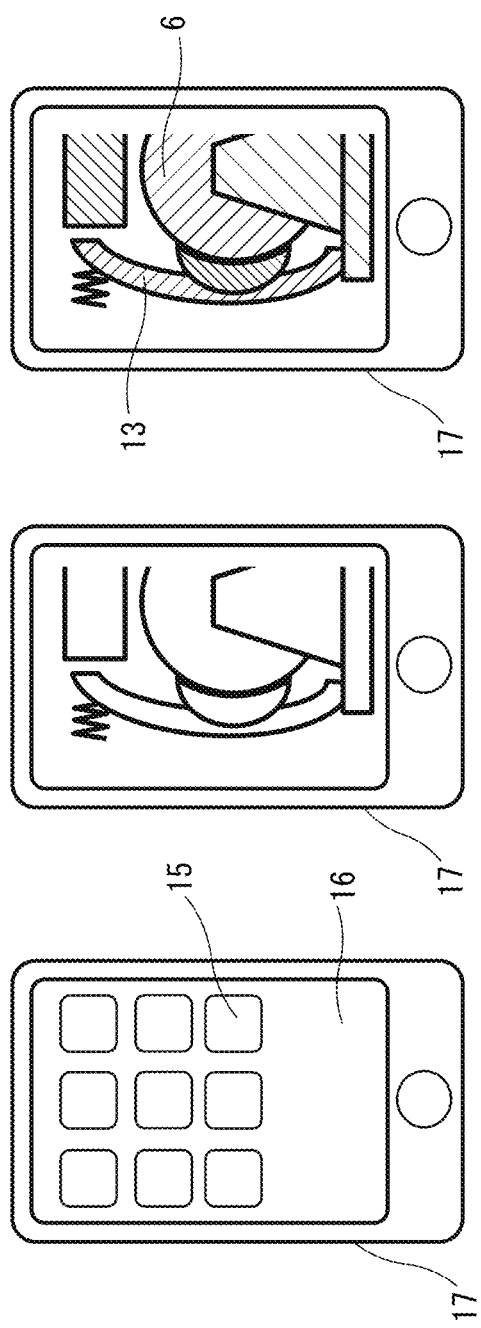
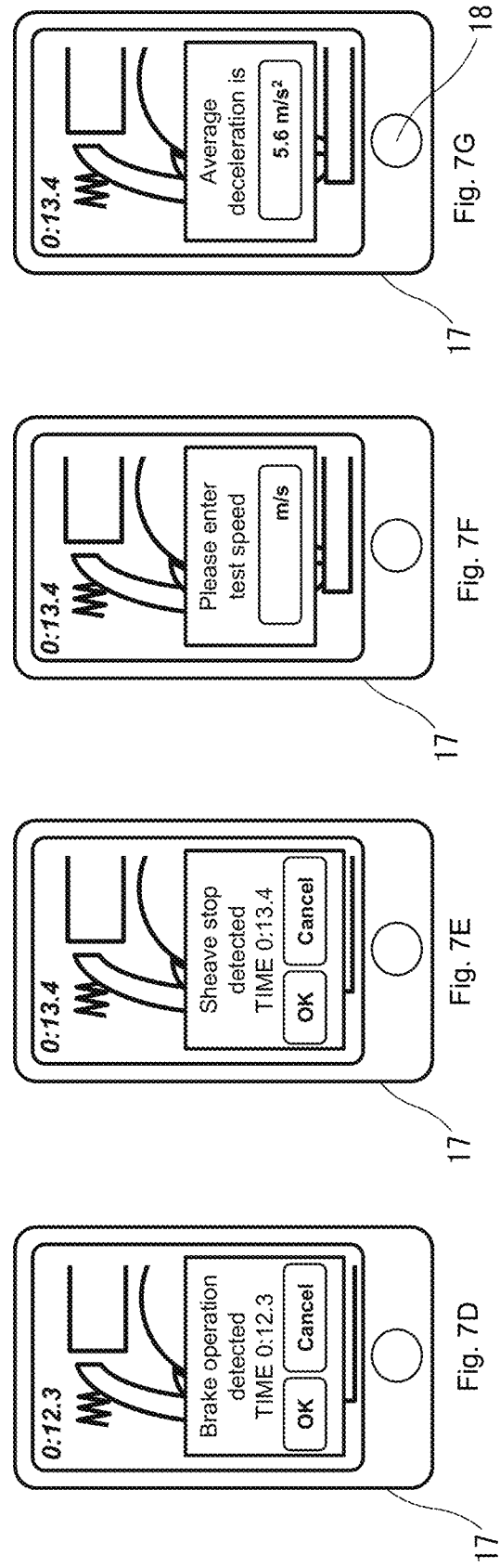

BRAKING DECELERATION MEASUREMENT OF AN ELEVATOR SYSTEM

TECHNICAL FIELD

The present invention relates generally to braking deceleration measurement of an elevator system. More particularly, the present invention relates to a mobile application and a method of measuring braking deceleration of an elevator based on a video of a motion of a hoisting machine taken by a mobile device.

BACKGROUND ART

Safety standards for elevator systems require a brake system equipped with various safety functions such as ascending car overspeed protection (ACOP), unintended car movement protection (UCMP), etc., in order to decelerate and/or stop the elevator car appropriately in case of emergency. To ensure safety, elevator brake system may be subjected to a periodic inspection at job site.

Basically, braking deceleration of an elevator car may be measured during inspection or emergency stop test to check whether the brake system works properly. Braking deceleration of an elevator car can be calculated from rated speed and deceleration distance of the elevator car. To obtain the deceleration distance of the elevator car, brake start position and stop position of the elevator car have to be measured. Since these positions are indirectly measured within the machine room by means of an elevator rope and/or traction sheave of the elevator car, rather than directly measured within the hoistway, obtaining accurate detection of the actual position of the elevator car, and thus, obtaining accurate measurement of deceleration has been difficult to achieve.

Therefore, there is a need for an improved system and method to allow safer and more accurate measurement of deceleration of elevator car.

SUMMARY OF INVENTION

According to one aspect of the present invention, a method of measuring braking deceleration of an elevator based on a video of a motion of a hoisting machine taken by a mobile device is disclosed. The motion of the hoisting machine includes a motion of a brake and a motion of a traction sheave. The method includes capturing the video, processing the video, and calculating a braking deceleration of the elevator based on the processed video.

In some embodiments, the method further includes uploading the video from the mobile device.

In some embodiments, the step of processing the video includes the steps of determining a first input in response to a timing of brake initiation in the video, recording the time when the first input is applied as brake initiation time, determining a second input in response to a timing of sheave stop in the video, and recording the time when the second input is applied as sheave stop time.

In some embodiments, the step of calculating a braking deceleration includes urging an input of elevator car speed.

In some embodiments, the step of calculating a braking deceleration further includes calculating a braking deceleration of the elevator based on the brake initiation time, the sheave stop time and the elevator car speed.

In some embodiments, the first input is determined manually by pressing an input button at the moment of brake initiation while viewing the video.

In some embodiments, the second input is determined manually by pressing an input button at the moment of sheave stop while viewing the video.

In some embodiments, the step of processing the video includes playing the video either in normal mode or in slow motion by varying play speed.

In some embodiments, the steps of determining the first and second inputs are performed automatically by image recognition technology.

In some embodiments, the step of determining the first input includes automatically pausing the video at the moment of brake initiation to confirm whether the detected timing of the brake initiation is correct.

In some embodiments, the step of determining the first input includes repeating the step if the detected timing of the brake initiation is incorrect.

In some embodiments, the step of determining the second input includes automatically pausing the video at the moment of sheave stop to confirm whether the detected timing of the sheave stop is correct.

In some embodiments, the step of determining the second input includes repeating the step if the detected timing of the sheave stop is incorrect.

In some embodiments, the method further includes automatically recognizing at least one movable portion of the brake and at least one movable portion of the traction sheave in the video.

In some embodiments, the step of automatically recognizing further includes urging to select at least one movable portion of the brake and at least one movable portion of the traction sheave for confirmation.

In some embodiments, the method is carried out on the same mobile device as the one that took the video.

According to another aspect of the present invention, a mobile application for measuring braking deceleration of an elevator based on a video of a motion of a hoisting machine taken by a mobile device is disclosed. The motion of the hoisting machine includes a motion of a brake and a motion of a traction sheave. The mobile application is capable of being executed on the mobile device. The application includes functions to capture the video, process the video, and calculate a braking deceleration of the elevator based on the processed video.

In some embodiments, the application further includes function to upload the video from the mobile device.

In some embodiments, the function to process the video further includes functions to determine a first input in response to a timing of brake initiation in the video, record the time when the first input is applied as brake initiation time, determine a second input in response to a timing of sheave stop in the video, and record the time when the second input is applied as sheave stop time.

In some embodiments, the function to calculate the braking deceleration includes urging an input of elevator car speed.

In some embodiments, the function to calculate the braking deceleration further includes calculating the braking deceleration based on the brake initiation time, the sheave stop time and the elevator car speed.

In some embodiments, the application further includes function to play video at variable speed.

In some embodiments, the first input is determined manually by pressing an input button at the timing of brake initiation while viewing the video.

In some embodiments, the second input is determined manually by pressing an input button at the timing of sheave stop while viewing the video.

In some embodiments, the functions to determine the first and second inputs are performed automatically by image recognition technology.

In some embodiments, the function to determine the first input includes automatically pausing the video at the moment of brake initiation to confirm whether the detected timing of the brake initiation is correct.

In some embodiments, the function to determine the first input is repeated if the previously detected timing of the brake initiation is incorrect.

In some embodiments, the function to determine the second input includes automatically pausing the video at the moment of sheave stop to confirm whether the detected timing of the sheave stop is correct.

In some embodiments, the function to determine the second input is repeated if the previously detected timing of the sheave stop is incorrect.

In some embodiments, the application further includes function to automatically recognize at least one movable portion of the brake and at least one movable portion of the traction sheave in the video.

In some embodiments, the function of automatically recognizing further includes urging to select at least one movable portion of the brake and at least one movable portion of the traction sheave for confirmation.

In some embodiments, the mobile device includes a smartphone, a personal computer, a tablet PC, a personal digital assistant and a cell phone.

In some embodiments, the application is installable on any mobile device through a mobile operating system platform associated with the mobile device.

These and other aspects of this disclosure will become more readily apparent from the following description and the accompanying drawings, which can be briefly described as follows.

BRIEF DESCRIPTION OF DRAWINGS

FIG. 6 is a flow diagram of exemplary operations of the deceleration calculation application for an elevator in accordance with the present invention in automatic processing mode.

FIGS. 7A-7G are a schematic diagram illustrating exemplary screens on a mobile device when the deceleration calculation application for an elevator in accordance with the present invention is launched in automatic processing mode.

DESCRIPTION OF EMBODIMENTS

Figure 1:
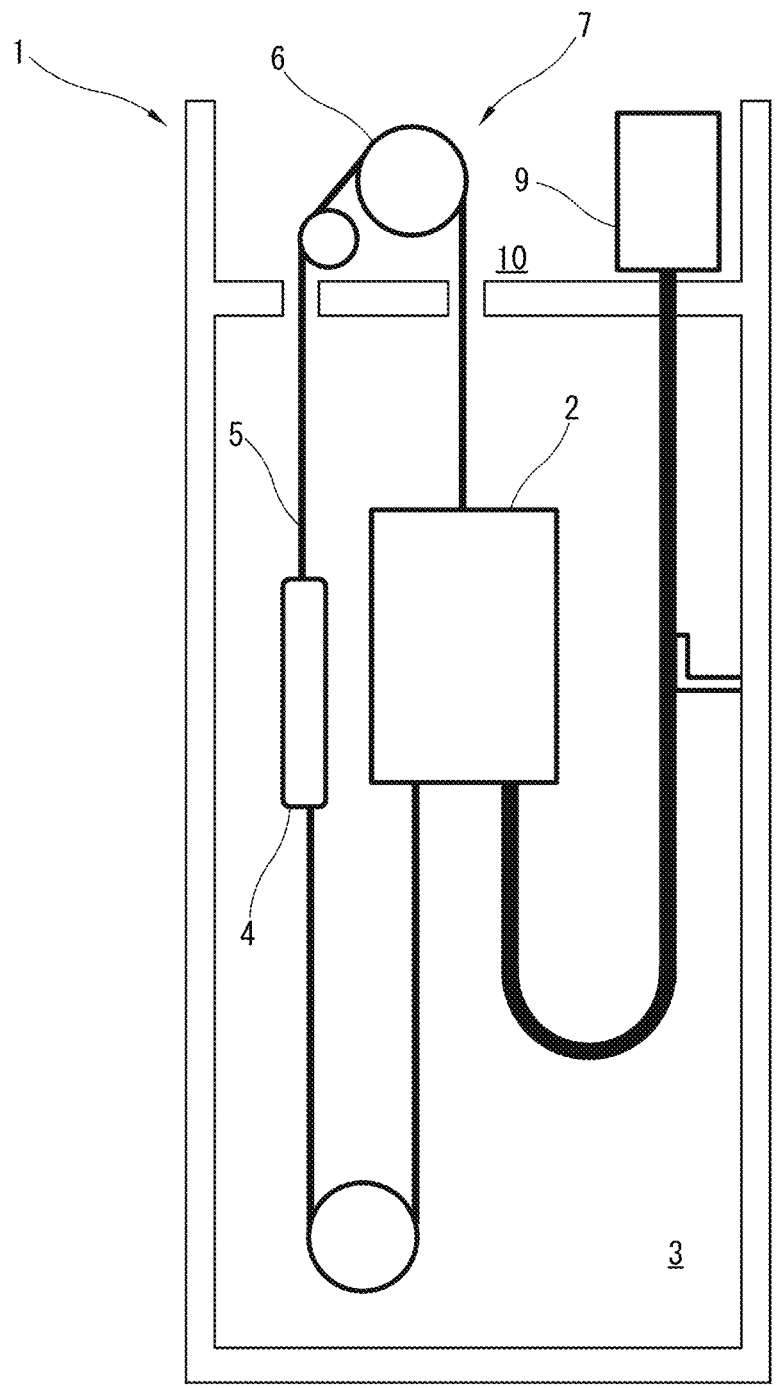
FIG. 1 is a schematic view showing one possible arrangement of an elevator system.

FIG. 1 shows a diagrammatic representation of an exemplary elevator system 1. The elevator system 1 includes an elevator car 2 configured to move vertically upward and downward within a hoistway 3. The elevator system 1 also includes a counterweight 4 operably connected to the elevator car 2 by a plurality of tension members 5, e.g. wire ropes or flat belts, that are wrapped around a traction sheave 6 of a hoisting machine 7. The elevator car 2 is connected to an elevator controller 9 via traveling cable for controlling movements of the elevator car 2. The hoisting machine 7 and the controller 9 are generally provided in a machine room 10 located above the hoistway 3.

When a maintenance person performs elevator brake maintenance, the maintenance person enters into the machine room 10, switches elevator operation to an inspection mode, e.g. emergency stop test mode, using the controller 9 and, then, checks brake operating conditions of the hoisting machine 7.

Conventionally, it has been necessary to manually determine brake start position and stop position of the elevator car with respect to the tension member 5 and/or traction sheave 6 at job site in order to measure braking deceleration of the elevator car 2. It makes accurate measurement of deceleration difficult.

According to the present invention, it is only necessary to record video of a motion of the hoisting machine 7 during inspection or emergency stop test, using a video application (Video app) or a video function of a deceleration calculation app pre-installed in a mobile device such as a smartphone. Using the video in conjunction with the deceleration calculation application (app) in accordance with the present invention that is installed in the mobile device, braking deceleration can be measured more easily and more accurately than in a conventional manner. Furthermore, the app of the present invention obviates the need for complicated and dangerous work involved in the determination of the brake start position and stop position of the elevator car at job site.

In the following, the specific measurement of braking deceleration according to the present invention will be described in detail.

Figure 2A:
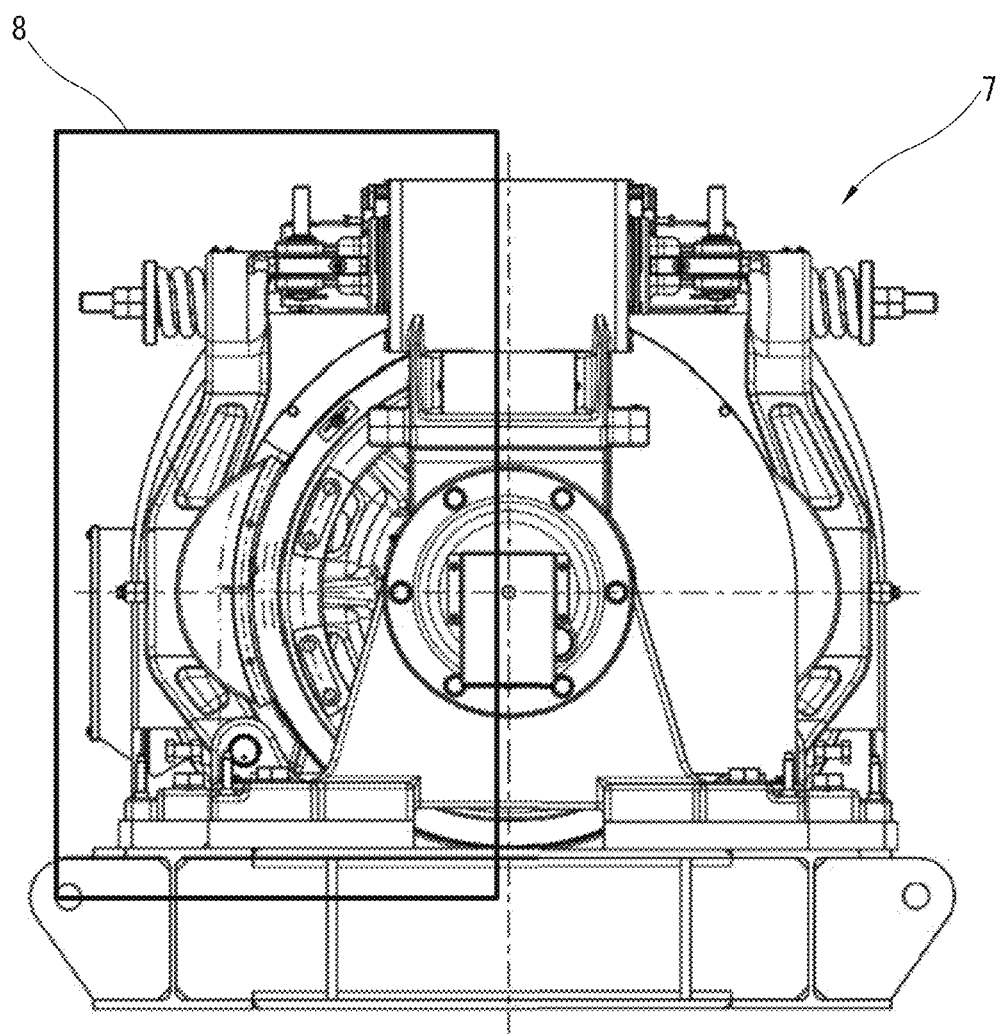
FIG. 2A is a front view of an exemplary hoisting machine of an elevator system.

FIG. 2A shows a front view of an exemplary hoisting machine 7 located in the machine room 10. A maintenance person who gained access to the machine room 10 records video of a motion of the hoisting machine 7 with a mobile device such as a smartphone from the start until the end of the inspection or emergency stop test. The portion enclosed by the rectangle 8 indicates an exemplary portion of the hoisting machine 7 that needs to be captured by the video app. When taking a video of a motion of the hoisting machine 7 during inspection or emergency stop test, at least one movable portion of the traction sheave and at least one movable portion of the brake have to be included in the area of the video image so that the maintenance person can identify the rotation of the traction sheave 6 and the motion of the brake when viewing the video. Thus, the rectangle 8 substantially corresponds to the area of the video image captured by the video app.

Figure 2B:
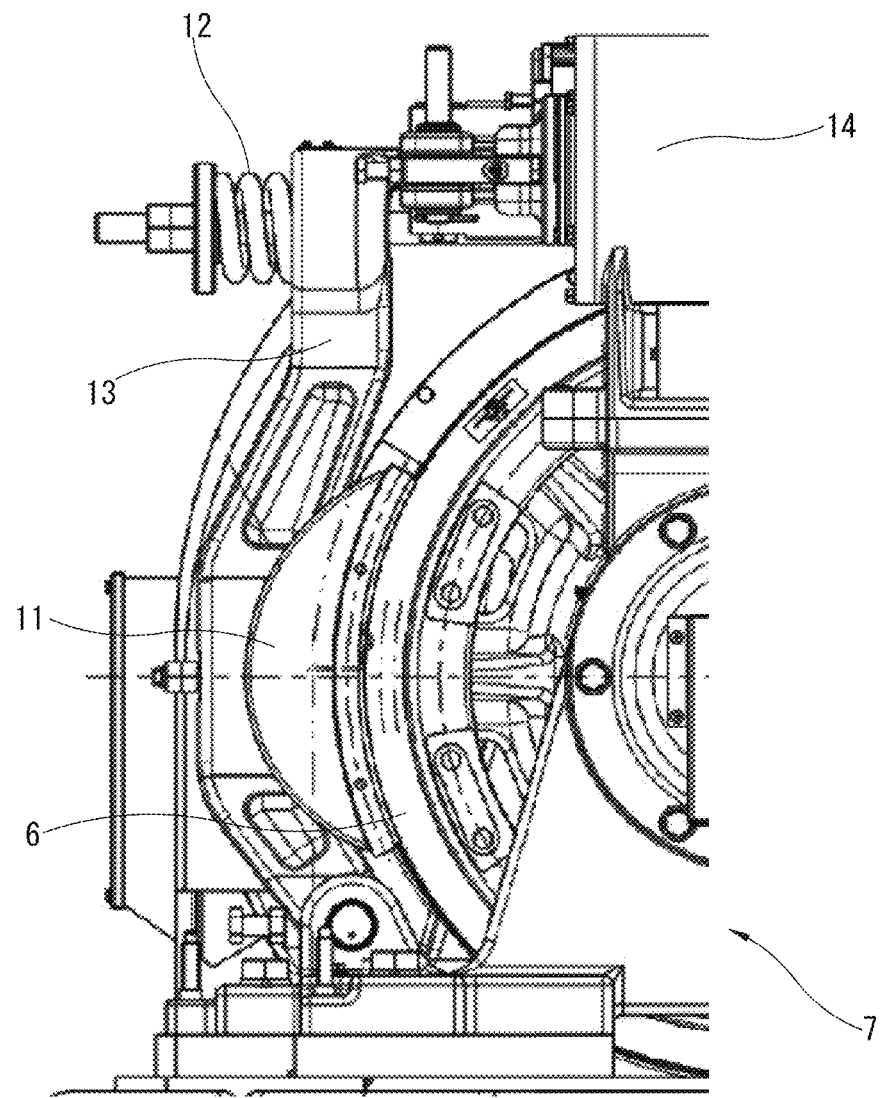
FIG. 2B is a schematic view illustrating an exemplary video image of a portion of FIG. 2A taken by a mobile device.

FIG. 2B shows a portion of an exemplary video image of the hoisting machine 7 captured with a video app during an emergency stop test. Note that this image contains left half portion of the brake and the traction sheave 6, however, according to various embodiments different portions of the machine 7 and brake may be captured in the video. As illustrated, brake pad 11 is disposed around the traction sheave 6. When the brake is actuated, a brake spring 12 biases a brake arm 13 and in turn biases the brake pad 11 against the traction sheave 6 to generate a braking force. On the other hand, when the brake is released, a brake armature 14 is controlled such that an electromagnetic force on the brake armature 14 overcomes the biasing force of the brake spring 12, and thereby the brake armature 14 moves the brake arm 13 and the brake pad 11 away from the traction sheave 6 so that the traction sheave 6 can rotate freely during normal operation of the elevator. Accordingly, when the brake is actuated, the brake arm 13 moves between the brake spring 12 and the brake armature 14. In the video image, the brake arm 13 may be recognized as a movable portion of the brake. As described later, the video taken on the mobile device during emergency stop test may then be processed by or uploaded to the deceleration calculation app of the present invention for the measurement of braking deceleration.

Although the present invention has been described with reference to a drum-type brake as shown for example in FIGS. 2A and 2B, the present invention can be used for any type of brake provided that actuations of the brake and traction sheave can be viewed from outside. It should be appreciated that the mobile device used in accordance with the present invention is not limited to a smartphone, but may include any type of portable device such as a personal computer (PC), a tablet PC, a personal digital assistant (PDA), a cell phone, etc., that can install the mobile application in accordance with the present invention through a mobile operating system platform associated with the mobile device.

Next, the method of measuring braking deceleration of an elevator based on a video image of a motion of the hoisting machine 7 in accordance with the present invention will be described with reference to FIGS. 3-7.

Figure 3:
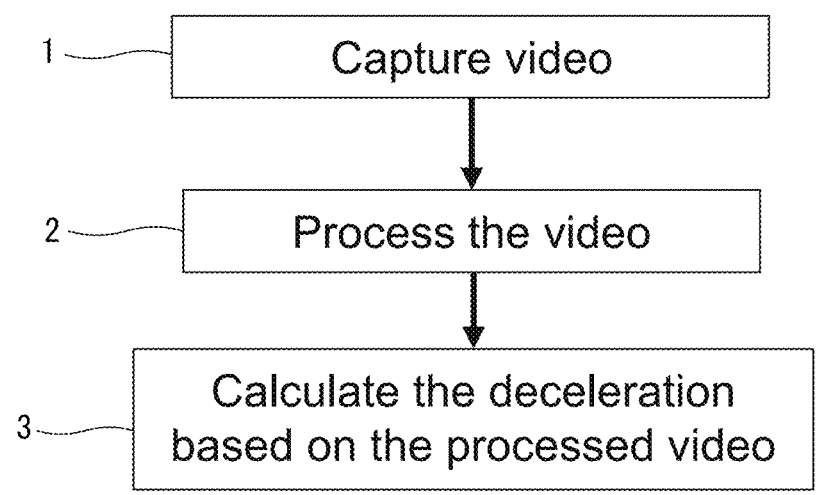
FIG. 3 is a flow diagram of operations of the deceleration calculation application for an elevator in accordance with the present invention.

FIG. 3 is a flow diagram of operations of the deceleration calculation application (app) for an elevator in accordance with the present invention. The process begins at step 1 where a maintenance person records video of a motion of the hoisting machine 7 with a mobile device during inspection or emergency stop test. At step 2, the video taken on the mobile device is processed in the app either by uploading a previously recorded video or by processing the video in real time. At step 3, the app calculates the deceleration based on the processed video. As described in detail below, the processing of the video may include automated process, manual process and a combination of both.

Figure 4:
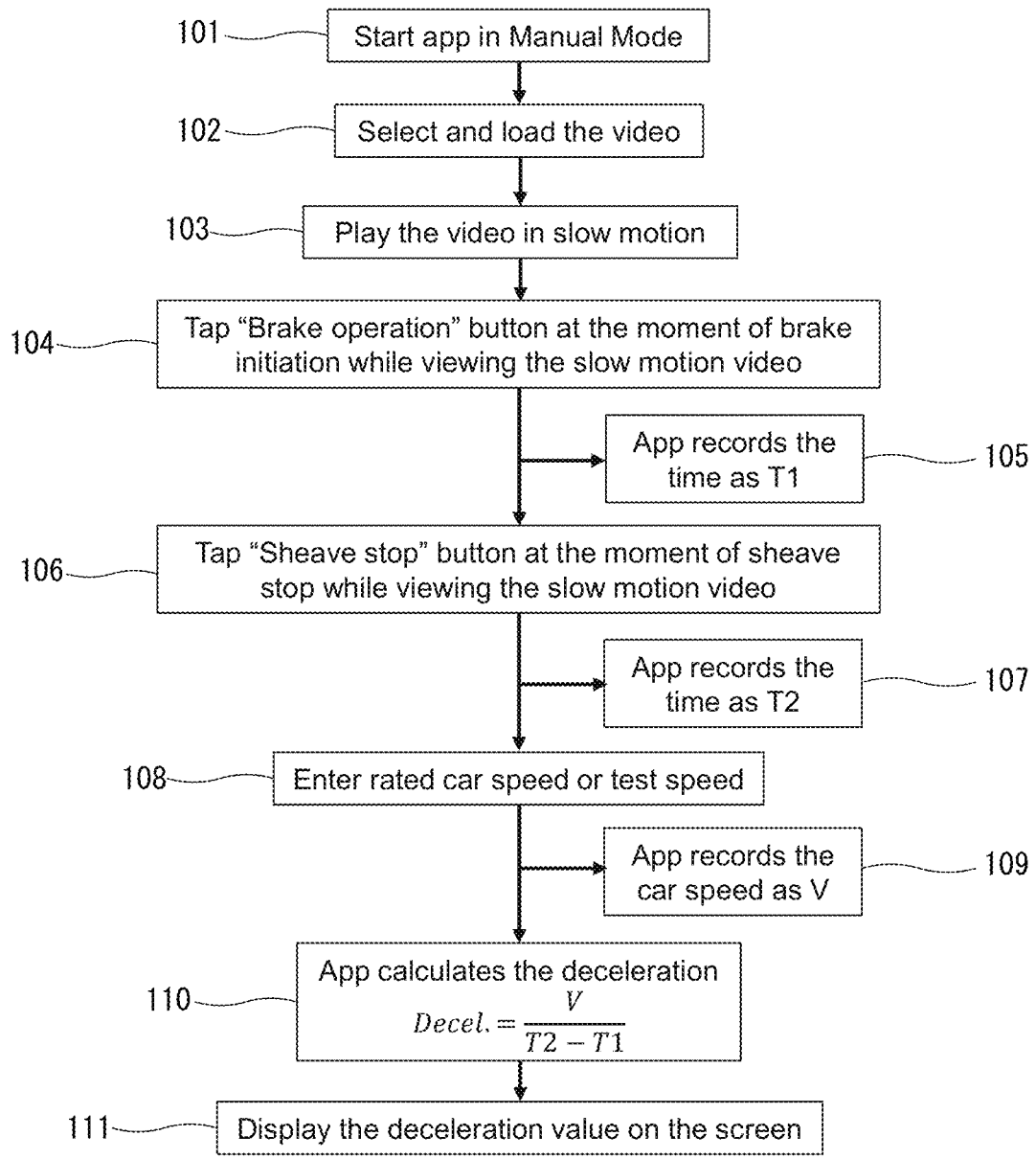
FIG. 4 is a flow diagram of exemplary operations of the deceleration calculation application for an elevator in accordance with the present invention in manual mode.

FIG. 4 is a flow diagram of exemplary operations of the deceleration calculation application (app) for an elevator in accordance with the present invention in manual mode. In the manual mode, a viewer or a maintenance person determines timings of brake initiation and sheave stop manually while viewing a video of a motion of a hoisting machine.

Figure 5A:
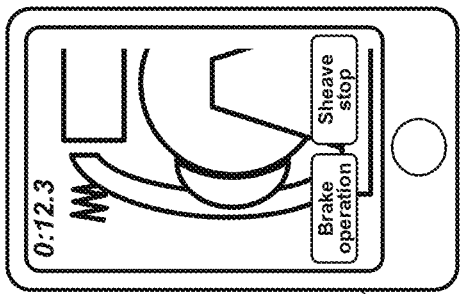
FIGS. 5A-5F are a schematic diagram illustrating exemplary screens on a mobile device when the deceleration calculation application for an elevator in accordance with the present invention is launched in manual mode.
Figure 5B:
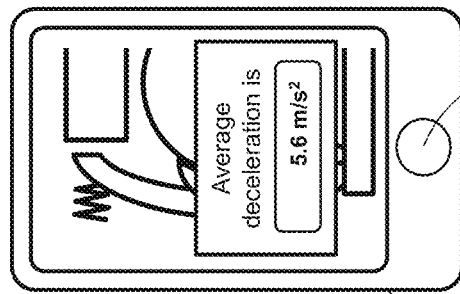
Figure 5C:
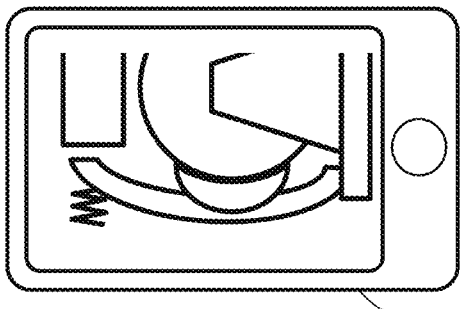
Figure 5D:
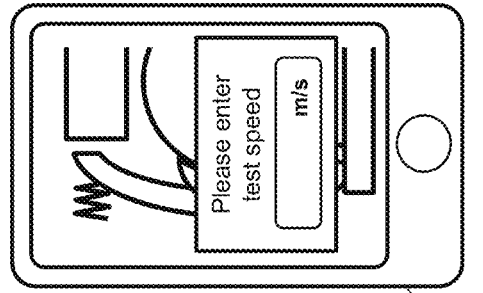
Figure 5E:
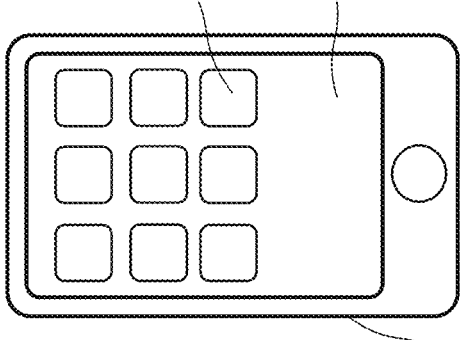
Figure 5F:
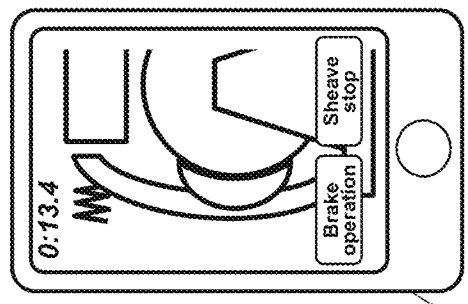

The process begins at step 101 where the app of the present invention 15 (see FIG. 5A) is launched from the home screen 16 of a mobile device, e.g. a smartphone 17 and manual mode is selected on the app 15. Then, at step 102, video thumbnails or a gallery of videos taken on the smartphone 17 appears on the display so that the maintenance person can select the video that they want to upload. Once the video is selected, the video is uploaded automatically and the video image appears on the display (FIG. 5B). At step 103, the uploaded video can be viewed on the screen by tapping on the play icon and, if desired, the video can be viewed in slow motion so that the maintenance person can determine when the brake operation is initiated and finished, i.e. when the brake arm 13 begins to move and when the traction sheave 6 comes to a complete stop. At step 104, the maintenance person may watch the video either in normal mode or in slow motion by varying play speed and tap "Brake operation" button at the moment of brake initiation (FIG. 5C), followed by proceeding to step 105 where the app 15 records the brake initiation time as T1 and resuming the video.

At step 106, the maintenance person may tap "Sheave stop" button at the moment when the sheave stop is identified in the video (FIG. 5D), followed by proceeding to step 107 where the app 15 records the sheave stop time as T2.

At step 108, when the maintenance person completes determining the brake initiation time T1 and the sheave stop time T2, a numeric input field appears on the display (FIG. 5E) into which the maintenance person can enter the rated speed or the test speed of the elevator car. After entering a numeric value, flow proceeds to step 109 where the app 15 records the car speed as V.

If all procedures are completed, flow proceeds to step 110 where the app 15 automatically calculates braking deceleration of the elevator car 2 based on the following equation:

$$\text{Deceleration} = \frac{V}{T2 - T1}$$

At step 111, the deceleration value is shown on the display (FIG. 5F) and the app 15 may be closed by pressing the home key 18.

FIG. 6 is a flow diagram of exemplary operations of the deceleration calculation application (app) for an elevator in accordance with the present invention in automatic processing mode. In the automatic processing mode, the app 15 automatically detects timings of the brake initiation T1 and the sheave stop T2 by image recognition technology.

The process begins at step 201 where the app 15 of the present invention (see FIG. 7A) is launched from the home screen 16 of the smartphone 17 and automatic processing mode is selected on the app 15. Then, at step 202, video thumbnails or a gallery of videos taken on the smartphone 17 appears on the display so that the maintenance person can select the video that they want to upload. Once the video is selected, the video is uploaded automatically and the video image appears on the display (FIG. 7B).

At step 203, the app 15 automatically recognizes components of the hoisting machine 7 and automatically color-codes each component on the display (FIG. 7C) by means of any image processing technology to make each component more distinguishable. Although each component is indicated by different hatching for convenience in FIG. 7C, it should be understood that each component is in fact displayed on the display in a different color.

Subsequently, at step 204, the maintenance person may select a movable portion of the brake, e.g. the brake arm 13, and a movable portion of the traction sheave 6 from automatically recognized components so that the app 15 can easily track the motion of the brake and the traction sheave. Specifically, the maintenance person may select the corresponding movable portions by tapping them on the display shown in FIG. 7C.

Once the movable portions are selected, the video may be played by tapping the play button at step 205. Then, at step 206, the video is automatically paused at the moment of brake initiation, i.e., when the app 15 detects that the portion of the brake 13 selected in the previous step starts moving toward the traction sheave 6. At step 207, the pop-up window appears on the display as shown in FIG. 7D which confirms whether the detected timing of the initiation of the brake operation is correct. If the detected timing of the brake initiation does not coincide with the video image, the maintenance person can cancel the auto-recognition process by tapping the "Cancel" button at step 208. If this is the case, the maintenance person may manually adjust the brake initiation time as described above with reference to FIG. 4, or the auto-recognition process may be repeated from step 205. If the detected timing of the brake initiation coincides with the video image, the maintenance person may tap the "OK" button at step 209. The app 15 then stores the brake initiation time as T1 and proceeds to the next step.

At step 210, the video is resumed. Subsequently, at step 211, the video image is automatically paused when the app 15 detects that the traction sheave 6 (the portion selected in step 204) comes to a complete stop. At step 212, the pop-up window appears on the display as shown in FIG. 7E which confirms whether the timing of the sheave stop is correct. If the detected timing of the sheave stop does not coincide with the video image, the maintenance person can cancel the auto-recognition process by tapping the "Cancel" button at step 213. If this is the case, the maintenance person may manually adjust the sheave stop time as described above with reference to FIG. 4, or the auto-recognition process may be repeated from step 210. If the detected timing of the sheave stop coincides with the video image, the maintenance person may tap the "OK" button at step 214. The app stores the sheave stop time as T2 and then proceeds to step 215.

At step 215, a numeric input field appears on the display (FIG. 7F) into which the maintenance person can enter the rated speed or the test speed of the elevator car 2. Once the maintenance person enters the rated car speed or the test speed, flow proceeds to step 216 where the app records the car speed as V.

If all procedures are completed, flow then proceeds to step 217 where the app 15 automatically calculates deceleration of the elevator car 2 based on the following equation:

$$\text{Deceleration} = \frac{V}{T2 - T1}$$

At step 218, the deceleration value is shown on the display (FIG. 7G) and the app 15 may be closed by pressing the home key 18.

With these configurations, elevator deceleration can be measured more accurately and safely just by capturing a motion of the hoisting machine with a mobile device during inspection or emergency stop test. The capturing may include either recording a video onto a storage device or streaming the video directly to the processing application in real or near real-time. Accordingly, brake test can be performed more easily without the need to add a special function or device for the measurement of braking deceleration to an elevator system. The method of measuring braking deceleration of an elevator in accordance with the present invention can be applicable to any type of elevator system, provided that actuations of the brake and traction sheave are visible from outside. The recorded video may be stored as a proof of periodic maintenance.

In addition, the app of the present invention can be downloaded directly to a mobile device through a mobile operating system platform. Thus, the app of the present invention can be obtained at low-cost or essentially at no cost.

While the present invention has been particularly shown and described with reference to the exemplary embodiments as illustrated in the drawings, it will be recognized by those skilled in the art that various modifications may be made without departing from the spirit and scope of the invention as disclosed in the accompanying claims.

What is claimed is:

1. A method of measuring braking deceleration of an elevator based on a video of a motion of a hoisting machine taken by a mobile device, the motion of the hoisting machine including a motion of a brake and a motion of a traction sheave, the method comprising:
    capturing the video;
    processing the video; and
    calculating a braking deceleration of the elevator based on the processed video;
    wherein processing the video includes:
        determining a first input in response to a timing of brake initiation in the video;
        recording the time when the first input is applied as brake initiation time;
        determining a second input in response to a timing of sheave stop in the video; and
        recording the time when the second input is applied as sheave stop time.

2. The method of claim 1, further comprising:
    uploading the video from the mobile device.

3. The method of claim 1, wherein calculating the braking deceleration includes urging an input of elevator car speed.

4. The method of claim 1, wherein calculating the braking deceleration further includes:
    calculating a braking deceleration of the elevator based on the brake initiation time, the sheave stop time and the elevator car speed.

5. The method of claim 1, wherein the first input is determined manually by pressing an input button at the moment of brake initiation while viewing the video.

6. The method of claim 1, wherein the second input is determined manually by pressing an input button at the moment of sheave stop while viewing the video.

7. The method of claim 1, wherein processing the video includes playing the video either in normal mode or in slow motion by varying play speed.

8. The method of claim 1, wherein determining the first and second inputs are performed automatically by image recognition technology.

9. The method of claim 8, wherein determining the first input includes automatically pausing the video at the moment of brake initiation to confirm whether the detected timing of the brake initiation is correct.

10. The method of claim 9, wherein determining the first input includes repeating the determining if the detected timing of the brake initiation is incorrect.

11. The method of claim 8, wherein determining the second input includes automatically pausing the video at the moment of sheave stop to confirm whether the detected timing of the sheave stop is correct.

12. The method of claim 11, wherein determining the second input includes repeating the determining if the detected timing of the sheave stop is incorrect.

13. The method of claim 8, further comprising:
    automatically recognizing at least one movable portion of the brake and at least one movable portion of the traction sheave in the video.

14. The method of claim 13, wherein automatically recognizing further includes urging to select at least one movable portion of the brake and at least one movable portion of the traction sheave for confirmation.

15. The method of claim 1, wherein the method is carried out on the same mobile device as the one that took the video.

16. A mobile application for measuring braking deceleration of an elevator based on a video of a motion of a hoisting machine taken by a mobile device, the motion of the hoisting machine including a motion of a brake and a motion of a traction sheave, the mobile application capable of being executed on the mobile device, the application comprising functions to:
  capture the video;
  process the video; and
  calculate a braking deceleration of the elevator based on the processed video;
wherein the function to process the video further includes functions to:
  determine a first input in response to a timing of brake initiation in the video;
  record the time when the first input is applied as brake initiation time;
  determine a second input in response to a timing of sheave stop in the video; and
  record the time when the second input is applied as sheave stop time.

17. The application of claim 16, wherein the application further includes function to upload the video from the mobile device.

18. The application of claim 16, wherein the function to calculate the braking deceleration includes urging an input of elevator car speed.

* * * * *